United States Patent
Hofman et al.

(10) Patent No.: US 9,313,998 B2
(45) Date of Patent: Apr. 19, 2016

(54) MILKING SYSTEM SHUT-OFF AND SENSORS

(71) Applicant: TECHNOLOGIES HOLDINGS CORP., Houston, TX (US)

(72) Inventors: Henk Hofman, Lemmer (NL); Peter Willem van der Sluis, IJsselmuiden (NL); Ype Groensma, Heereveen (NL)

(73) Assignee: Technologies Holdings Corp., Houston, TX (US)

( * ) Notice: Subject to any disclaimer, the term of this patent is extended or adjusted under 35 U.S.C. 154(b) by 145 days.

(21) Appl. No.: 14/276,193

(22) Filed: May 13, 2014

(65) Prior Publication Data
US 2014/0245958 A1 Sep. 4, 2014

Related U.S. Application Data

(63) Continuation of application No. 13/115,587, filed on May 25, 2011, now Pat. No. 8,752,504.

(51) Int. Cl.
*A01J 5/007* (2006.01)
*A01J 5/013* (2006.01)
*A01J 3/00* (2006.01)

(52) U.S. Cl.
CPC .. *A01J 5/007* (2013.01); *A01J 3/00* (2013.01); *A01J 5/013* (2013.01); *A01J 5/0133* (2013.01); *A01J 5/0135* (2013.01); *A01J 5/0138* (2013.01)

(58) Field of Classification Search
CPC ........... A01J 5/007; A01J 5/013; A01J 5/003; A01J 5/0131; A01J 5/0136
See application file for complete search history.

(56) References Cited

U.S. PATENT DOCUMENTS

| | | | |
|---|---|---|---|
| 4,280,445 A * | 7/1981 | Phillips | A01J 5/041 119/14.02 |
| 4,344,385 A | 8/1982 | Swanson et al. | |
| 4,499,854 A | 2/1985 | Hoefelmayr et al. | |
| 7,162,970 B2 | 1/2007 | Maier, Jr. | |
| 2011/0017323 A1 | 1/2011 | Herbst | 137/551 |

FOREIGN PATENT DOCUMENTS

| | | | |
|---|---|---|---|
| EP | 0 677 243 A2 | 10/1995 | ................ A01J 7/00 |
| EP | 1 279 326 A1 | 1/2003 | .............. A01J 5/017 |
| GB | 2 055 543 | 1/1980 | |

OTHER PUBLICATIONS

*PCT Notification of Transmittal of the International Search Report and the Written Opinion of the International Searching Authority* for International Application No. PCT/US2012/038330; 11 pages, Sep. 12, 2012.

*EPO*, Office Action for Application No. 12 724 473.9-1655 file ref. No. THC 026 PCT/EP, 5 pages, Feb. 16, 2015.

"Communication pursuant to Article 94(3) EPC", Application No. 12 724 473.9-1655; 9 pages, dated Jan. 15, 2016 and received Feb. 11, 2016.

\* cited by examiner

*Primary Examiner* — Monica Williams
(74) *Attorney, Agent, or Firm* — Baker Botts L.L.P.

(57) ABSTRACT

A method, comprises receiving a flow of milk at an inlet of a manifold. The inlet comprises a first end coupled to a hose that receives a flow of milk from a teat cup and a second end terminating in a chamber of the manifold. The manifold comprises one or more other inlets and a plurality of outlets. The plurality of outlets includes one or more milk collector outlets and one or more drain outlets. The method proceeds by causing the flow of milk to be directed to a corresponding milk collector outlet by causing a shut-off valve corresponding to the inlet to open, and by causing a drain valve corresponding to the inlet to close. The method concludes by causing the flow of milk to be directed to a corresponding drain outlet by causing the shut-off valve corresponding to the inlet to close, and by causing the drain valve corresponding to the inlet to open.

20 Claims, 5 Drawing Sheets

MILKING SYSTEM SHUT-OFF AND SENSORS

CROSS REFERENCE TO RELATED APPLICATIONS

This application is a continuation of U.S. patent application Ser. No. 13/115,587, entitled "Milking System Shut Off and Sensors," which was filed on May 25, 2011, now U.S. Pat. No. 8,752,504, which is hereby incorporated by reference.

TECHNICAL FIELD

This invention relates generally to dairy farming and more particularly to a milking system shut-off and sensors.

BACKGROUND OF THE INVENTION

Over time, the size and complexity of dairy milking operations has increased. Accordingly, the need for efficient and scalable systems and methods that support dairy milking operations has also increased. Systems and methods supporting dairy milking operations, however, have proven inadequate in various respects.

SUMMARY OF THE INVENTION

According to embodiments of the present disclosure, disadvantages and problems associated with previous systems supporting dairy milking operations may be reduced or eliminated.

In certain embodiments, an apparatus includes a plurality of inlets and a plurality of outlets. Each inlet is adapted to receive a flow of milk from a dairy livestock, and each outlet is adapted to receive a flow of milk from a corresponding one or more inlets. The plurality of outlets include one or more milk collector outlets and one or more drain outlets. Each milk collector outlet is adapted to direct the flow of milk received from the corresponding one or more inlets to a milk collector. Each drain outlet is adapted to direct the flow of milk received from the corresponding one or more inlets to a discard area. The apparatus further includes one or more valves each associated with one of the plurality of inlets. The one or more valves are adapted to direct the flow of milk received at the associated inlet to either a corresponding one of the one or more milk collector outlets or a corresponding one of the one or more drain outlets.

Particular embodiments of the present disclosure may provide one or more technical advantages. For example, in certain embodiments, the apparatus of the present disclosure integrates into a single manifold a plurality of inlets adapted to receive milk and a plurality of outlets adapted to selectively output the milk to a receiver jar to be stored or to a separator to be discarded. Additionally, in certain embodiments, the apparatus of the present disclosure may include valves to control the flow of milk through the outlets and quality/flow sensors integrated with the manifold. Integrating inlets, outlets, valves, and/or sensors into a single manifold may allow for efficient connections between milking components and may provide a compact and/or low cost solution for sorting milk.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
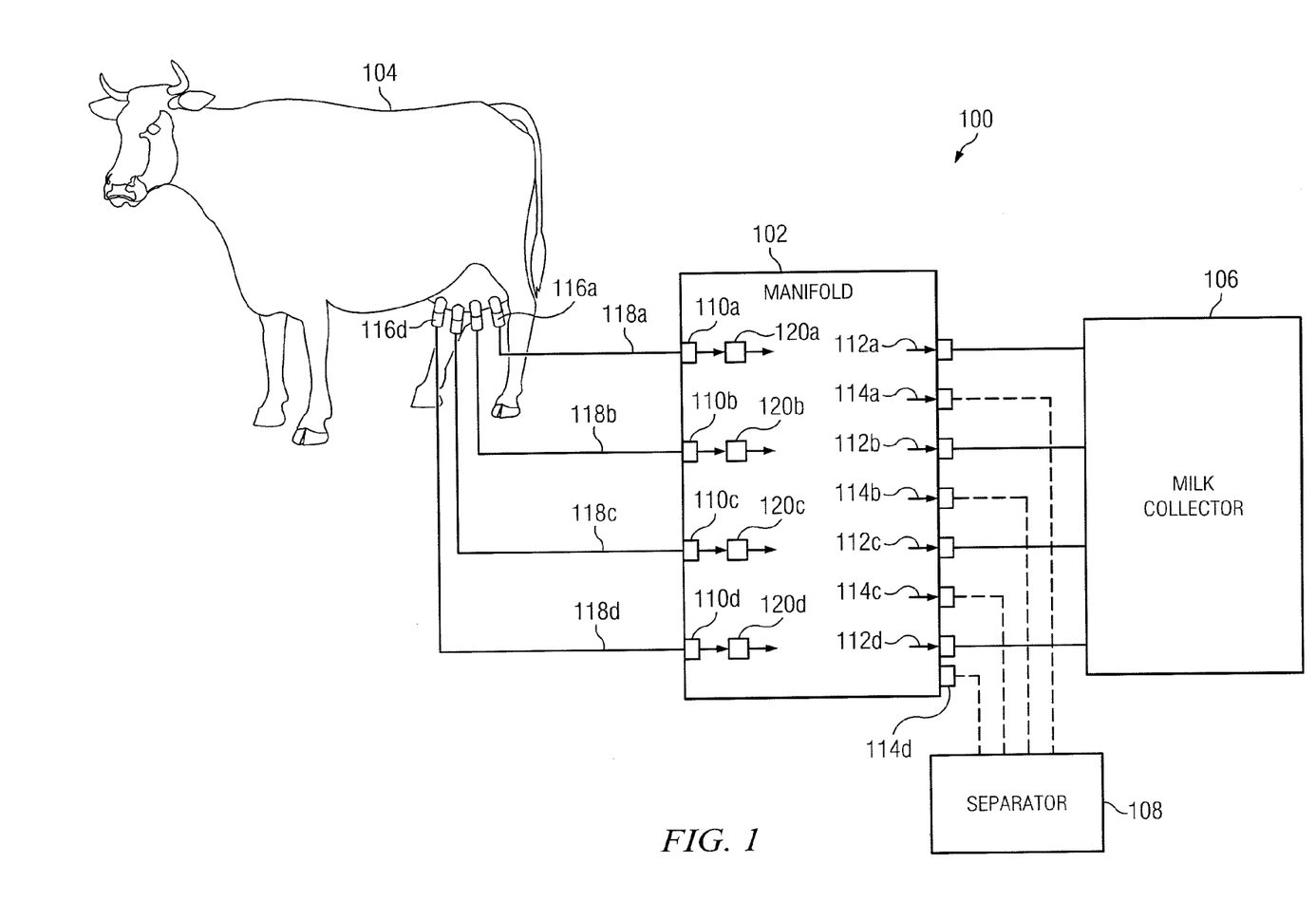
FIG. 1 illustrates an example milking system, according to certain embodiments of the present disclosure.

FIG. 1 illustrates an example milking system 100, according to certain embodiments of the present disclosure. System 100 includes a manifold 102 directing milk collected from a dairy livestock 104 to either a milk collector 106 (for milk determined to be "good," as described below) or a separator 108 (for milk determined to be "bad," as described below). Manifold 102 may include a plurality of inlets 110, one or more milk collector outlets 112, and one or more drain outlets 114. Inlets 110 may refer to any structure suitable to receive a flow of milk into manifold 102 (e.g., from a teat of dairy livestock 104). Outlets 112/114 may refer to any structure suitable to output a flow of milk from manifold 102.

In certain embodiments, manifold 102 may be placed in (or proximate to) a milking area (e.g., a milking box) that facilitates milking of a dairy livestock 104. Although the present disclosure contemplates that dairy livestock 104 includes any suitable dairy livestock (e.g., a cow, a goat, a sheep, a water buffalo, or any other dairy livestock), the remainder of this description will be described with regard to a dairy cow 104 for purposes of simplicity. The milking area may include a milking apparatus comprising a number of teat cups 116, each configured for attachment to a teat of a dairy cow 104. Each teat cup 116 may be coupled to a hose 118 connected to an inlet 110 of manifold 102 such that a flow of milk may be delivered from a teat of a dairy cow 104 to an inlet 110 of manifold 102.

As described in detail with regard to FIGS. 2A-2C below, manifold 102 may include one or more milk quality sensors 120 facilitating a determination regarding the quality of the milk received at inlets 110. If the milk quality is determined to be "good," the milk may be directed to a milk collector 106 (e.g., a receiver jar that collects the milk and stores it at a cool temperature) via a milk collector outlet 112. If the milk quality is determined to be "bad," the milk may be directed to a separator 108 (e.g., a discard chamber) via a drain outlet 114. One or more valves (e.g., shut-off valves 122 and drain valves 128) may be used to control the flow of milk between inlets 110 and milk collector outlets 112/drain outlets 114.

Figure 2A:
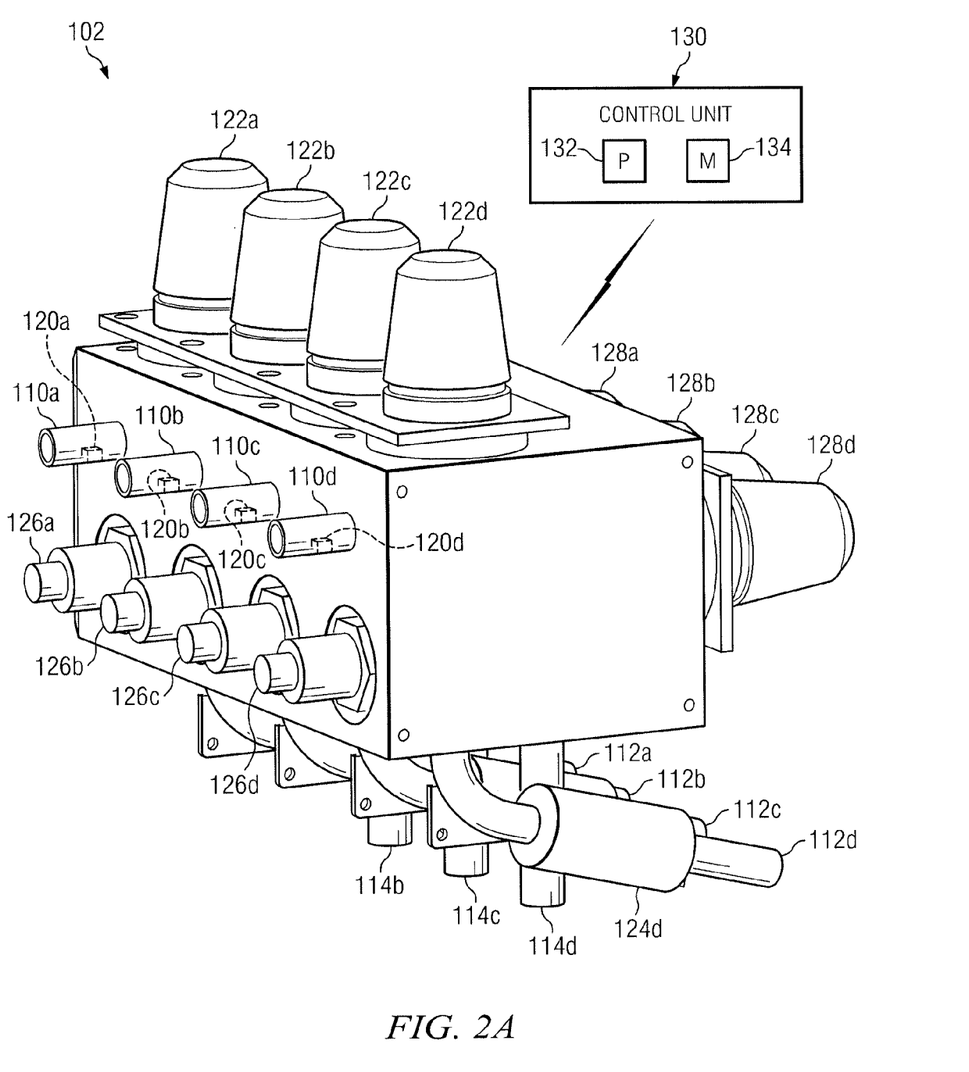
FIGS. 2A-2C illustrate detailed views of the example manifold depicted in FIG. 1, according to certain embodiments of the present disclosure.
Figure 2B:
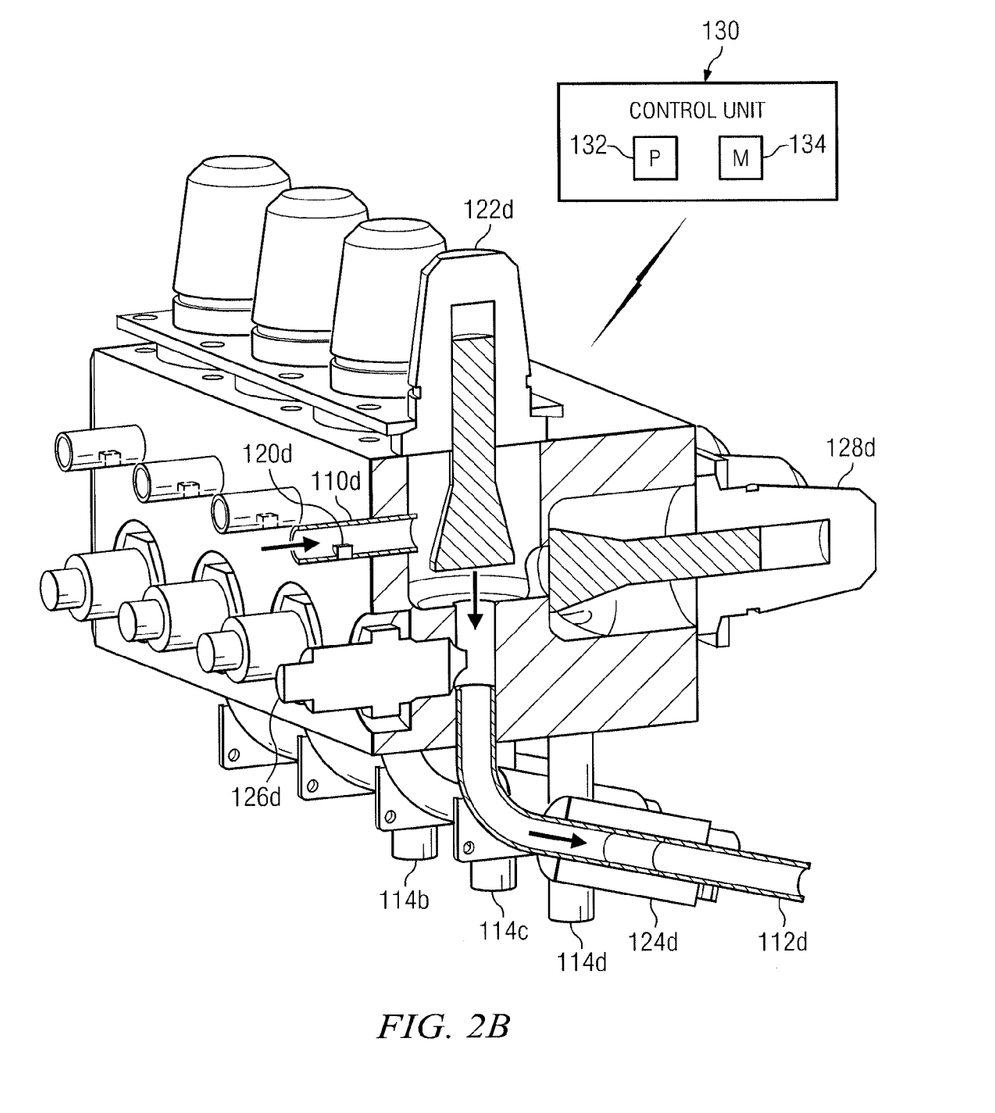
Figure 2C:
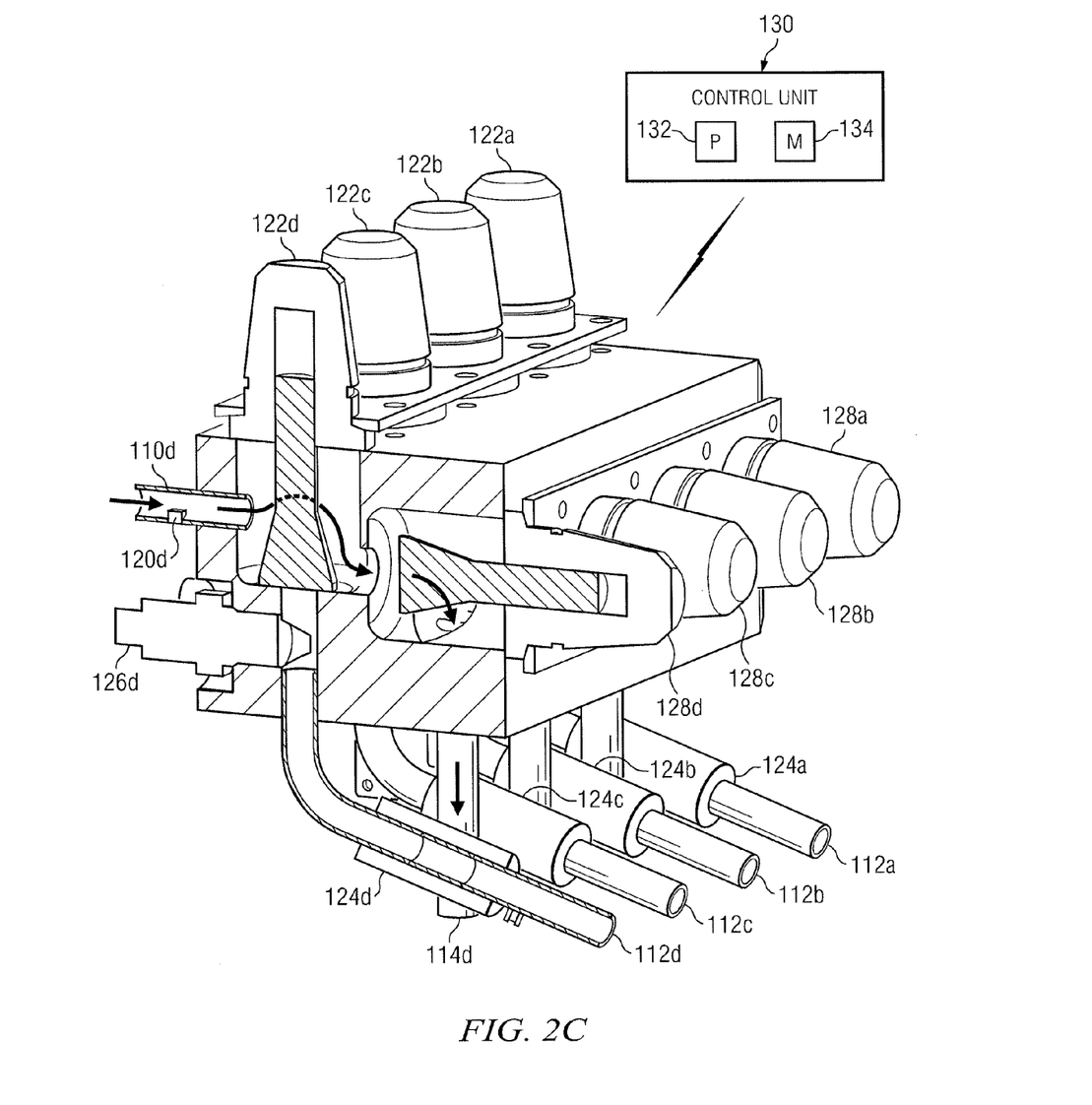

FIG. 2A-2C illustrate detailed views of example manifold 102, according to certain embodiments of the present disclosure. As described above with regard to FIG. 1, manifold 102 may include one or more inlets 110, one or more milk collector outlets 112, and one or more drain outlets 114. Additionally, manifold 102 may include one or more shut-off valves 122, one or more flow sensors 124, one or more vacuum sensors 126, and one or more drain valves 128.

In certain embodiments, each of the one or more inlets 110 of manifold 102 may be adapted to receive a flow of milk from a teat of a dairy cow 104. For example, manifold 102 may include four inlets 110a-110d, and each inlet 110 may receive a flow of milk via a hose 118 from a teat cup 116 configured for attachment to one of the four teats of a dairy cow 104. Each teat cup 116 may be adapted to extract milk from the dairy cow 104. For example, a vacuum pressure (e.g., generated by a vacuum source) may be applied to facilitate attachment of the teat cup 116 to the teat of dairy cow 104 and/or to facilitate extraction of milk from dairy cow 104.

In certain embodiments, the application of a vacuum pressure to teat cups 116 may be controlled by one or more shut-off valves 122 of manifold 102. For example, each shut-off valve 122, when in an open position, may allow a vacuum pressure to be applied to a corresponding teat cup 116 such that the corresponding teat cup 116 may extract milk from a teat of a dairy cow 104. Conversely, each shut-off valve 122, when in the closed position, may prevent vacuum pressure from being applied to a corresponding teat cup 116 such that the extraction of milk may be stopped and the corresponding teat cup 116 removed from the teat of the dairy cow 104.

Shut-off valves 122 may each comprise any suitable valve configured to control the application of a vacuum pressure to a corresponding teat cup 116. For example, shut-off valves 122 may each comprise a plug and a diaphragm molded from one or more parts. When atmospheric pressure or a positive air pressure is acting on the back side of the diaphragm, shut-off valve 122 may move to a closed position (preventing a vacuum pressure from being applied via a corresponding teat cup 116). Conversely, when a vacuum pressure is acting on the back side of diaphragm, the shut-off valve may remain in the open position (allowing a vacuum pressure to be applied via a corresponding teat cup 116). In certain embodiments, a spring may be used to cause shut-off valves 122 to remain in the open position in the absence of an air pressure being applied to the diaphragm.

In certain embodiments, shut-off valves 122 may each include or be configured to communicate with (via wireless or wireline communication) a control unit 130. For purposes of simplicity, it will be assumed throughout the remainder of this description that a single control unit 130 serves each of the shut-off valves 122. Control unit 130 may include one or more computer systems at one or more locations. Each computer system may include any appropriate input devices (such as a keypad, touch screen, mouse, or other device that can accept information), output devices, mass storage media, or other suitable components for receiving, processing, storing, and communicating data. Both the input devices and output devices may include fixed or removable storage media such as a magnetic computer disk, CD-ROM, or other suitable media to both receive input from and provide output to a user. Each computer system may include a personal computer, workstation, network computer, kiosk, wireless data port, personal data assistant (PDA), one or more processors within these or other devices, or any other suitable processing device. In short, control unit 130 may include any suitable combination of software, firmware, and hardware.

Control unit 130 may additionally include one or more processing modules 132. Processing modules 132 may each include one or more microprocessors, controllers, or any other suitable computing devices or resources and may work, either alone or with other components to provide a portion or all of the functionality described herein. Control unit 130 may additionally include (or be communicatively coupled to via wireless or wireline communication) memory 134. Memory 134 may include any memory or database module and may take the form of volatile or non-volatile memory, including, without limitation, magnetic media, optical media, random access memory (RAM), read-only memory (ROM), removable media, or any other suitable local or remote memory component.

In certain embodiments, control unit 130 may be operable to determine whether a shut-off valve 122 should be in an open position or a closed position. In response to a determination that a shut-off valve 122 should be in the closed position, control unit 130 may communicate a signal to the shut-off valve 122, the signal causing the shut-off valve 122 to move to the closed position (e.g., by applying an air pressure to a diaphragm, as described above).

For example, control unit 130 may determine whether a shut-off valve 122 should be in an open position or a closed position by determining whether a predetermined amount of time has expired since a corresponding teat cup 116 was attached to a teat of a dairy cow 104 (such that a cow is milked for the predetermined amount of time). If the predetermined amount of time has not expired, control unit 130 may determine that the shut-off valve 122 should be in the open position. If the predetermined amount of time has not expired, control unit 130 may determine that the shut-off valve 122 should be in the open position.

As another example, control unit 130 may determine whether a shut-off valve 122 should be in an open position or a closed position by processing signals received from one or more flow sensors 124 of manifold 102. Each flow sensor 124 of manifold 102 may be adapted to generate a signal corresponding to a measured the flow rate of milk received by and/or exiting manifold 102. If control unit 130 determines that a measured flow rate is greater than a threshold, controller 130 may determine that a corresponding shut-off valve should remain in an open position. If control unit 130 determines that a measured flow rate is less than the threshold, controller 130 may determine that a corresponding shut-off valve should remain in an open position. Although a particular number of flow sensors 124 are depicted as being located at particular positions within manifold 102, the present disclosure contemplates any suitable number of flow sensors 124 located at any suitable locations within or separate from manifold 102.

In certain embodiments, manifold 102 may additionally include one or more vacuum sensors 126. For example, manifold 102 may include a vacuum sensor 126 associated with each inlet 110. Each vacuum sensor 126 may be operable to generate a signal corresponding to the vacuum pressure associated with a corresponding teat cup 116. The generated signals, when communicated to control unit 130, may serve as a feedback loop by which control unit 130 may determine if a shut-off valve 122 has stopped the application of vacuum pressure to a corresponding teat cup 116. Although a particular number of vacuum sensors 126 are depicted as being located at particular positions within manifold 102, the present disclosure contemplates any suitable number of vacuum sensors 126 located at any suitable locations within or separate from manifold 102.

As described above, when a vacuum pressure is applied to teat cups 116, milk may be extracted from the teats of the dairy cow 104. That milk may pass through hoses 118 and be received at inlets 110 of manifold 102. The milk received at each inlet 110 may be passed to either (1) a corresponding milk collector outlet 112 (which may supply good milk to a milk collector 106), or (2) a corresponding drain outlet 114 (which may supply bad milk to a separator 108). In certain embodiments, the flow of milk from inlets 110 to corresponding milk collector outlets 112 or corresponding drain outlets 114 may be controlled by the one or more shut-off valves 122 operating in conjunction with one or more drain valves 128.

The one or more drain valves 128 may be configured and operate in a manner substantially similar to shut-off valves 122, described above.

For example, in the valve configuration depicted in FIG. 2B, shut-off valve 122*d* is in the open position and drain valve 128*d* is in the closed position such that good milk received at inlet 110*d* is directed to milk collector outlet 112*d*. Conversely, in the valve configuration depicted in FIG. 2C, shut-off valve 122*d* is in the closed position and drain valve 128*d* is in the open position such that bad milk received at inlet 110*d* is directed to drain outlet 114*d*.

In certain embodiments, drain valves 128, like shut-off valves 122 described above, may each include or be configured to communicate with (via wireless or wireline communication) a control unit 130. For purposes of simplicity, it will be assumed throughout the remainder of this description that the single control unit 130 serving shut-off valves 122 (as described above) additionally serves each of drain valves 128.

In certain embodiments, control unit 130 may be operable to determine whether milk received at an inlet 110 is good (such that the milk should pass to a corresponding milk collector outlet 112) or bad (such that the milk should pass to a corresponding drain outlets 114). For example, control unit 130 may be configured to communicate with one or more milk quality sensors 120. Milk quality sensors 120 may each include any suitable sensor for generating a signal corresponding to a quality of milk. For example, milk quality sensors 120 may include one or more of a milk conductivity sensor, a milk color sensor, and a milk temperature sensor. Although a particular number of milk quality sensors 120 are depicted as being integrated with manifold 102 (i.e., a single sensor 120 positioned within each inlet 110), the present disclosure contemplates any suitable number of milk quality sensors 120 integrated with or external to manifold 102.

Control unit 130 may be operable to receive a signal from a milk quality sensor 120 and determine, by comparing the signal to a corresponding quality threshold, whether the milk quality received at inlet 110 is good or bad. As one particular example, control unit 130 may receive a signal from a milk quality sensor 120 configured to measure milk conductivity, and the control unit 130 may compare that signal with a quality threshold to determine whether the milk quality is good (e.g., when the measured conductivity is lower than the threshold) or bad (when the measured conductivity is greater than the threshold).

If control unit 130 determines that the milk quality received at an inlet 110 is good, signals may be communicated to the appropriate shut-off valve 122 and drain valve 128, the signals causing the valves 122/128 to be positioned such that milk is directed to a corresponding milk collector outlet 112 (i.e., shut-off valve 122 is open and drain valve 128 is closed, as depicted in FIG. 2B). The milk collector outlet 112 may then receive the flow of milk from the inlet 110 and may direct the flow of milk to a collection area, such as milk collector 106. If control unit 130 determines that the milk quality received at an inlet 110 is bad, signals may be communicated to the appropriate shut-off valve 122 and drain valve 128, the signals causing the valves 122/128 to be positioned such that milk is directed to a corresponding drain outlet 114 (i.e., shut-off valve 122 is closed and drain valve 128 is open, as depicted in FIG. 2C). The drain outlet 114 may then receive the flow of milk from the inlet 110 and may direct the flow of milk to a discard area, such as separator 108.

The above-described example manifold 102 may, in certain embodiments, provide one or more technical advantages. For example, a plurality of inlets adapted to receive milk and a plurality of outlets adapted to selectively output milk to either a receiver jar (to be stored) or to a separator (to be discarded) may each be formed in the single manifold 102. Additionally, in certain embodiments, manifold 102 may include valves to control the flow of milk through the outlets and quality/flow sensors integrated with the manifold 102. Integrating inlets, outlets, valves, and/or sensors into the single manifold 102 may allow for efficient connections between milking components and may provide a compact and/or low cost solution for sorting milk.

Modifications, additions, or omissions may be made to the manifold 102 described above without departing from the scope of the disclosure. The components may be integrated or separated. Moreover, the operations may be performed by more, fewer, or other components. Additionally, the operations may be performed using any suitable logic comprising software, hardware, and/or other logic.

Figure 3:
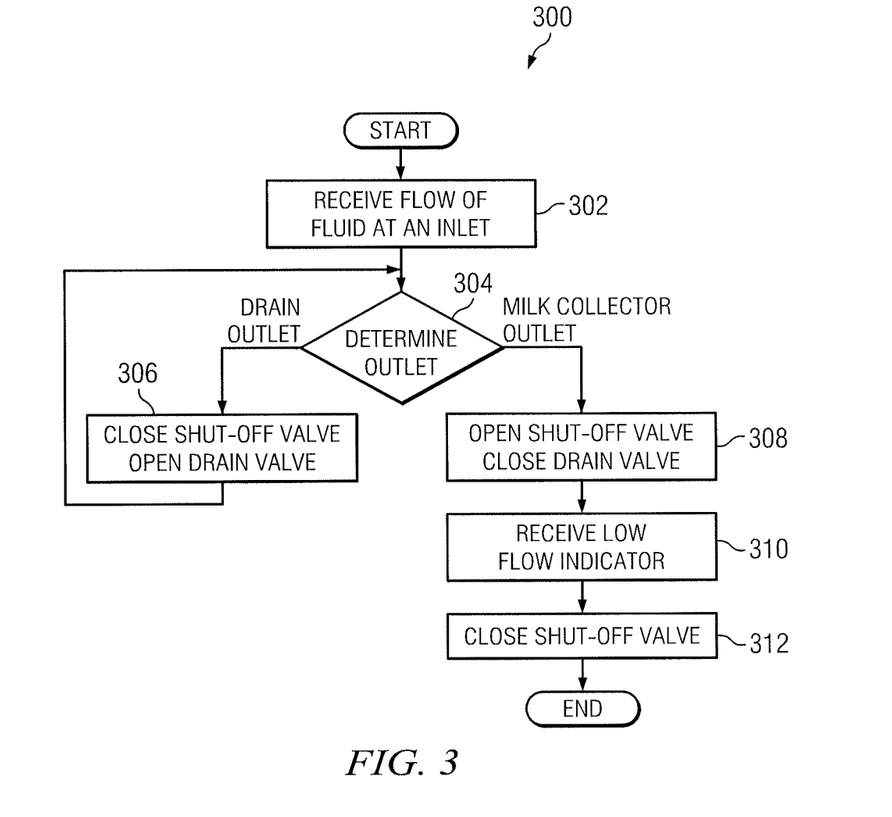
FIG. 3 illustrates an example of a use scenario for the manifold depicted in FIGS. 2A-2C, according to certain embodiments of the present disclosure.

FIG. 3 illustrates an example of a use scenario 300 for manifold 102 depicted in FIGS. 2A-2C, according to certain embodiments of the present disclosure. The method begins at step 302 where a flow of milk is received at an inlet 110 of manifold 102. At step 304, it is determined (e.g., by a control unit 130) whether to direct the flow of milk to a milk collector outlet 112 or a drain outlet 114 corresponding to inlet 110. In certain embodiments, a signal received from a milk quality sensor may be used to facilitate the determination. If the signal indicates the flow comprises good milk, the flow of milk may be directed to a milk collector outlet 112. If the milk signal indicates the flow comprises bad milk, the flow of milk may be directed to a drain outlet 114.

Upon a determination to direct the flow of milk to drain outlet 114 in step 304, the method proceeds to step 306 to close a shut-off valve 122 corresponding to milk collector outlet 112 and open a drain valve 128 corresponding to drain outlet 114. Drain outlet 114 may comprise a distinct drain outlet 114 (e.g., a drain outlet 114 that corresponds to inlet 110 and does not correspond to any of the other inlets 110 of manifold 102) or a shared drain outlet 114 (e.g., a drain outlet 114 that corresponds to inlet 110 and one or more of the other inlets 110 of manifold 102). In certain embodiments, shut-off valve 122 and/or drain valve 128 may comprise an air-actuated valve. An air actuated valve may be closed by applying air pressure to a diaphragm of the valve in order to position a plug in the path of the flow of milk. An air actuated valve may be opened by removing air pressure from the diaphragm in order to remove the plug from the path of the flow of milk.

After closing shut-off valve 122 and opening drain valve 128, the method may return to step 304 to update the determination. If the quality of the flow of milk continues to be bad, the method may continue directing the flow of milk to drain outlet 114. If the quality of the flow of milk becomes good, for example, due to a next dairy cow being connected to the milking equipment, the method may direct the flow of milk to milk collector outlet 112.

Upon a determination to direct the flow of milk to milk collector outlet 112 at step 304, the method may proceed to step 308 to open a shut-off valve 122 corresponding to milk collector outlet 112 and close a drain valve 128 corresponding to drain outlet 114. Milk collector outlet 112 may comprise a distinct milk collector outlet 112 (e.g., a milk collector outlet 112 that corresponds to inlet 110 and does not correspond to any of the other inlets 110 of manifold 102) or a shared milk collector outlet 112 (e.g., a milk collector outlet 112 that corresponds to inlet 110 and one or more of the other inlets 110 of manifold 102).

At step 310, a signal may be generated by a flow sensor 124 associated with milk the collector outlet 112 corresponding to the inlet from which the flow of milk is being received. The generated signal may indicate whether the amount of flow (e.g., the measurement of the flow rate) is less than a flow threshold. The amount of flow may be less than the flow threshold, for example, when the dairy cow has been milked out and the current milking cycle should be ended. In response to receiving a signal indicating that the measured flow is less than a flow threshold (e.g., from control unit 130), shut-off valve 122 corresponding to milk collector outlet 112 may be closed at step 312. Closing shut-off valve 122 may cause vacuum pressure to be released from teat cup 116 such that teat cup 116 stops extracting milk. As a result, the corresponding hose 118 stops receiving milk, and corresponding inlet 110 stops receiving milk. The method then ends.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
   receiving a flow of milk at each of a plurality of inlets of a manifold, each inlet comprising a first end coupled to a hose that receives a flow of milk from a teat cup and a second end terminating in a chamber of the manifold, the manifold comprising a plurality of outlets, the plurality of outlets including one or more milk collector outlets and one or more drain outlets;
   directing at least a portion of the flow of milk from a first inlet to a corresponding milk collector outlet by causing a shut-off valve corresponding to the first inlet to open and by causing a drain valve corresponding to the first inlet to close, wherein the milk collector outlet comprises a first end forming a collector opening in the chamber of the manifold and a second end coupled to a milk collector;
   directing the flow of milk received by the milk collector outlet to the milk collector;
   directing at least a portion of the flow of milk from a second inlet to a corresponding drain outlet by causing a shut-off valve corresponding to the second inlet to close and by causing a drain valve corresponding to the second inlet to open, wherein the drain outlet comprises a first end forming a discard opening in the chamber of the manifold and a second end coupled to a discard area; and
   directing the flow of milk received by the drain outlet to the discard area.

2. The method of claim 1, further comprising:
   receiving a signal from a flow sensor, the signal corresponding to the flow rate of the flow of milk received by the milk collector outlet;
   determining, based on the signal, whether the flow rate of the flow of milk is less than a flow threshold; and
   causing the shut-off valve corresponding to the first inlet to close in response to determining that the flow rate of the flow of milk is less than a flow threshold.

3. The method of claim 1, further comprising:
   receiving a signal from a milk quality sensor, the signal corresponding to a quality level of the flow of milk received by the first inlet;
   determining, based on the signal, if the quality of the flow of milk received by the first inlet exceeds a quality threshold;
   causing the flow of milk to be directed to the corresponding milk collector outlet in response to determining that the quality of the flow of milk received by the first inlet does exceed the quality threshold; and
   causing the flow of milk to be directed to a drain outlet corresponding to the first inlet in response to determining that the quality of the flow of milk received by the first inlet does not exceed a quality threshold.

4. A method, comprising:
   receiving a flow of milk at an inlet of a manifold, the inlet comprising a first end coupled to a hose that receives a flow of milk from a teat cup and a second end terminating in a chamber of the manifold, the manifold comprising one or more other inlets and a plurality of outlets, the plurality of outlets including one or more milk collector outlets and one or more drain outlets;
   causing the flow of milk to be directed to a corresponding milk collector outlet by:
      causing a shut-off valve corresponding to the inlet to open; and
      causing a drain valve corresponding to the inlet to close; and
   causing the flow of milk to be directed to a corresponding drain outlet by:
      causing the shut-off valve corresponding to the inlet to close; and
      causing the drain valve corresponding to the inlet to open.

5. The method of claim 4, wherein the milk collector outlet that corresponds to the inlet comprises a distinct milk collector outlet, the distinct milk collector outlet not corresponding to the other inlets of the manifold.

6. The method of claim 4, wherein the drain outlet that corresponds to the inlet comprises a distinct drain outlet, the distinct drain outlet not corresponding to the other inlets of the manifold.

7. The method of claim 4, wherein the milk collector outlet that corresponds to the inlet comprises a shared milk collector outlet, the shared milk collector outlet corresponding to one or more of the other inlets.

8. The method of claim 4, wherein the drain outlet that corresponds to the inlet comprises a shared drain outlet, the shared drain outlet corresponding to one or more of the other inlets.

9. The method of claim 4, further comprising:
   receiving a signal from a milk quality sensor, the signal corresponding to a quality level of the flow of milk received by the inlet;
   determining, based on the signal, if the quality of the flow of milk received by the inlet exceeds a quality threshold;
   causing the flow of milk to be directed to the corresponding milk collector outlet in response to determining that the quality of the flow of milk received by the inlet does exceed the quality threshold; and
   causing the flow of milk to be directed to the corresponding drain outlet in response to determining that the quality of the flow of milk received by the inlet does not exceed a quality threshold.

10. The method of claim 9, wherein the milk quality sensor comprises one of:
a conductivity sensor;
a milk color sensor; and
a milk temperature sensor.

11. The method of claim 4, further comprising:
receiving a signal from a flow sensor, the signal corresponding to the flow rate of the flow of milk received by the corresponding milk collector outlet;
determining, based on the signal, whether the flow rate of the flow of milk is less than a flow threshold; and
causing the shut-off valve corresponding to the inlet to close in response to determining that the flow rate of the flow of milk is less than a flow threshold.

12. The method of claim 4, wherein the milk collector outlet comprises a first end forming a collector opening in the chamber of the manifold and a second end coupled to a milk collector, wherein the milk collector outlet directs the flow of milk received from the inlet to the milk collector.

13. The method of claim 12, wherein when the shut-off valve is open, it directs the flow of milk through the collector opening formed in the chamber to the milk collector and, when closed, it prohibits the flow of milk through the collector opening formed in the chamber to the milk collector and stops application of vacuum pressure to the teat cup.

14. The method of claim 4, wherein the drain outlet comprises a first end forming a discard opening in the chamber of the manifold and a second end coupled to a discard area, wherein the drain outlet directs the flow of milk received from the inlet to the discard area.

15. The method of claim 14, wherein when the drain valve is open, it directs the flow of milk through the discard opening formed in the chamber to the discard area and, when closed, it prohibits the flow of milk through the discard opening formed in the chamber to the discard area.

16. The method of claim 4, wherein the manifold comprises:
four inlets;
four milk collector outlets; and
four drain outlets.

17. The method of claim 16, wherein:
each inlet is associated with a distinct milk collector outlet; and
at least two of the inlets are associated with a shared drain outlet.

18. The method of claim 16, wherein at least two of the inlets are associated with a shared milk collector outlet.

19. The method of claim 4, wherein:
the valves each comprise a plug actuated by a diaphragm, the plug and the diaphragm molded as a single part; and
the valves close when an air pressure is applied to the diaphragm, and open when the air pressure is removed from the diaphragm.

20. A method, comprising:
receiving a flow of milk at each of a plurality of inlets of a manifold, each inlet comprising a first end coupled to a hose that receives a flow of milk from a teat cup and a second end terminating in a chamber of the manifold, the manifold comprising a plurality of outlets, the plurality of outlets including one or more milk collector outlets and one or more drain outlets;
directing at least a portion of the flow of milk from a first inlet to a corresponding first milk collector outlet by causing a first shut-off valve corresponding to the first inlet to open and by causing a first drain valve corresponding to the first inlet to close, wherein the first milk collector outlet comprises a first end forming a collector opening in the chamber of the manifold and a second end coupled to a milk collector;
directing the flow of milk received by the first milk collector outlet to the milk collector;
directing at least a portion of the flow of milk from a second inlet to a corresponding second milk collector by causing a second shut-off valve corresponding to the second inlet to open and by causing a second drain valve corresponding to the second inlet to close, wherein the second milk collector comprises a first end forming a collector opening in the chamber of the manifold and a second end coupled to the milk collector; and
directing the flow of milk received by the second milk collector to the milk collector.

* * * * *